(12) United States Patent
Harvey

(10) Patent No.: US 10,208,965 B2
(45) Date of Patent: Feb. 19, 2019

(54) DEVICE FOR PREHEATING INLET OF A HOT WATER SUPPLY

(71) Applicant: Sid Harvey Industries, Inc., Garden City, NY (US)

(72) Inventor: David Harvey, Garden City, NY (US)

(73) Assignee: Sid Harvey Industries, Inc., Garden City, NY (US)

( * ) Notice: Subject to any disclaimer, the term of this patent is extended or adjusted under 35 U.S.C. 154(b) by 0 days.

(21) Appl. No.: 15/437,270

(22) Filed: Feb. 20, 2017

(65) Prior Publication Data

US 2017/0241648 A1    Aug. 24, 2017

Related U.S. Application Data

(60) Provisional application No. 62/296,718, filed on Feb. 18, 2016.

(51) Int. Cl.
| | | |
|---|---|---|
| *F24D 17/00* | (2006.01) | |
| *E03C 1/00* | (2006.01) | |
| *F28D 7/10* | (2006.01) | |
| *F28D 21/00* | (2006.01) | |
| *E03C 1/044* | (2006.01) | |

(52) U.S. Cl.
CPC ............ *F24D 17/0005* (2013.01); *E03C 1/00* (2013.01); *E03C 1/044* (2013.01); *F28D 7/10* (2013.01); *F28D 21/0012* (2013.01); *E03C 2001/005* (2013.01); *Y02B 30/566* (2013.01)

(58) Field of Classification Search
CPC ............................... F24D 17/0005; F28D 7/10
See application file for complete search history.

(56) References Cited

U.S. PATENT DOCUMENTS

| 4,202,406 | A | * | 5/1980 | Avery | A47L 15/4291 137/386 |
|---|---|---|---|---|---|
| 4,256,170 | A | * | 3/1981 | Crump | A47L 15/4291 165/146 |
| 4,304,292 | A | * | 12/1981 | Cardone | F24D 17/001 165/156 |
| 4,372,372 | A | * | 2/1983 | Hunter | F24D 17/0005 165/109.1 |
| 4,373,572 | A | * | 2/1983 | Kaufmann | F24D 17/001 165/139 |
| 4,398,308 | A | * | 8/1983 | Berg | A47K 3/28 165/66 |
| 4,412,526 | A | * | 11/1983 | DeGrose | F24D 3/08 122/14.1 |
| 4,619,311 | A | * | 10/1986 | Vasile | F24D 17/0057 165/47 |
| 5,791,401 | A | * | 8/1998 | Nobile | E03C 1/00 137/247.41 |
| 6,722,421 | B2 | * | 4/2004 | MacKelvie | F24D 17/0005 165/140 |

* cited by examiner

*Primary Examiner* — Nathaniel Herzfeld
(74) *Attorney, Agent, or Firm* — Jason L DeFrancesco

(57) ABSTRACT

The instant invention provides for a kit and method of raising inlet temperature of a water supply by utilizing thermodynamic properties associated with difference in temperatures across a gradient and friction. In particular a portion of an inlet supply pipe is disposed in a sewer line such that the opposing flow of waste water and related material interacts with the inlet piping by increasing the temperature thereof.

7 Claims, 11 Drawing Sheets

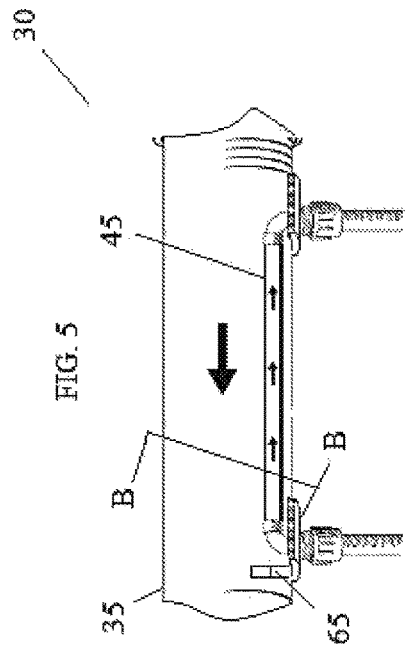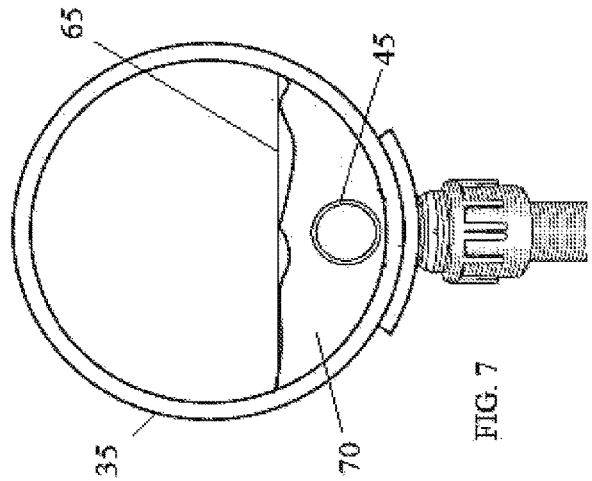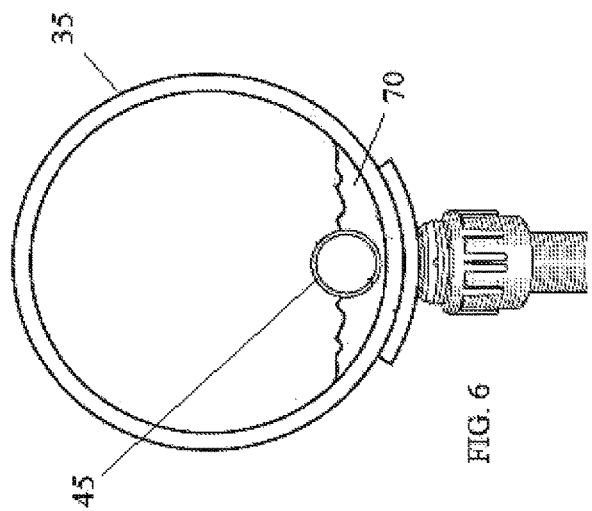

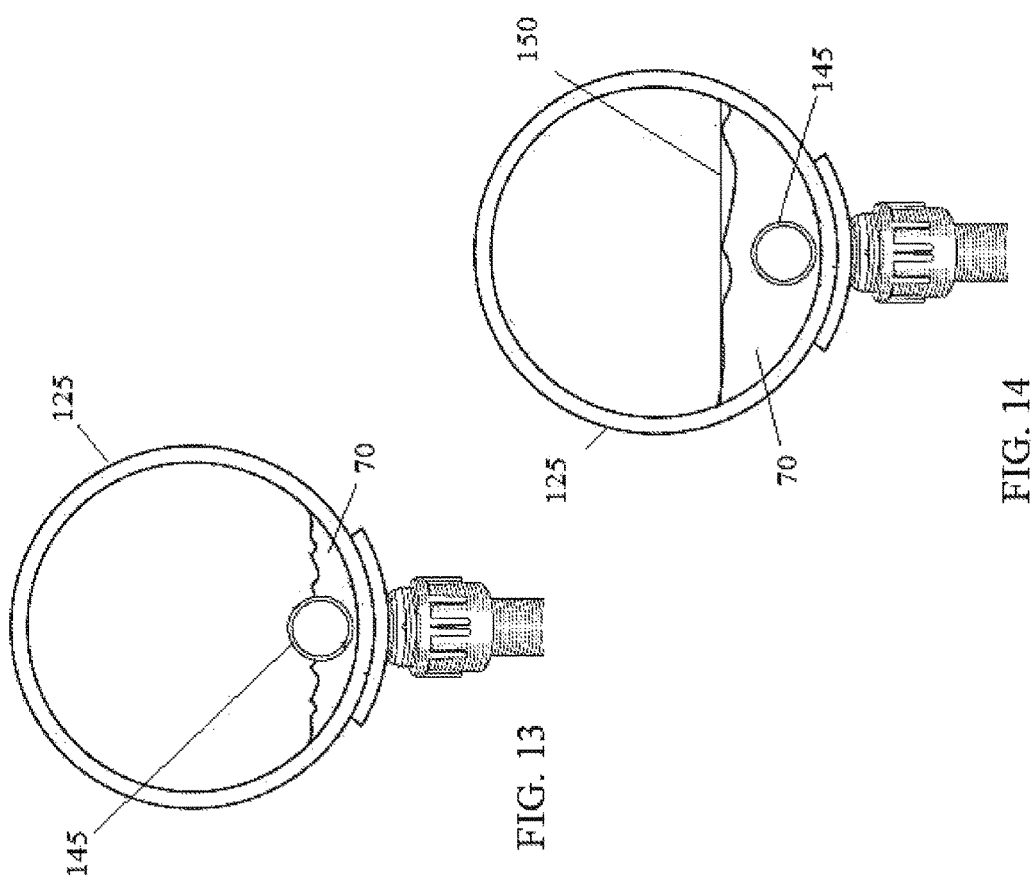

DEVICE FOR PREHEATING INLET OF A HOT WATER SUPPLY

I. FIELD OF INVENTION

The present invention generally relates to plumbing systems and heat exchange, in particular the invention regards plumbing with respect to water supply inlets, sewage and drainage and, more specifically preheating inlet of a hot water supply prior to entering a heating unit, such as a hot water heater.

II. BACKGROUND

A residential home for example has a water supply inlet pipe that directs water from a source, such as a well or a city-supply source from outside, i.e., beyond the home, to a plumbing supply source within a home. Typically the inlet water is cold and therefore some must be directed to a heating unit prior to being used as a hot water source as provided for with a sink, shower, clothing and or dish washing machine. Other cold water may be directed to a sink, shower, toilet, clothing and or dish washing machine.

After cold and hot water is used at a source, it is typically directed through a drain and or toilet to a sewage system which consists of a series of pipes such as a sewage pipe, which may direct the spent water and accompanying waste from inside a home through a basement, or crawl space for example, and may lead the refused waste water and or sewage (collectively, "sewage") into a septic tank or other city refuse conduit. It should be understood that the cold water, after being used at a source, exhibits a higher temperature than when it was initially provided at source.

The amount of energy used by a heating unit to heat inlet water to a desired temperature, prior to it being directed to a source, is directly related to the temperature of the inlet water prior to it being heated. For example, if the cooler the inlet water the more energy required to heat to the desired temperature. There is a need in the industry to efficiently reduce the amount of energy associated with heating inlet water. The inventor of the instant invention has discovered such a way to use heat from sewage and or spent water travelling through a sewer and or drain as a heating source to preheat the temperature of inlet water so that the energy required to heat the inlet by a heating unit is efficiently reduced.

III. SUMMARY OF THE INVENTION

In the instant invention, a water supply source and or water inlet pipe is redirected so it is preheated before being heated by a heating unit such as a water heater. In an embodiment, an inlet supply is directed through an interior portion of a sewage pipe, causing the cold water to be preheated. Because sewage is already naturally warmer than the inlet supply water coming from outside, passage of sewage within a drain that contacts an outer surface of an inlet pipe disposed within said sewer will preheat the inlet water, resulting in an overall savings of energy by reducing the amount of energy required to heat inlet water.

It is an embodiment of the invention that the device for preheating inlet of a water supply, as disclosed herein, is easy to install by retrofit, with no disruption of living space for example if the relevant sewage system includes an unfinished basement or an exposed vertical sewer line. An advantage of an embodiment of the invention is that it does not require repiping a sewer and or drain system to separate gray water from sewer water. Additionally, the instant invention does not require relatively large amounts of sewage to be used in order for there to be effective recovery or a substantial amount of savings. Further, no electrical pumps or added energy usage is required and the installation is maintenance free, with no cleaning required, considering when a drain being used includes that from a flushing toilet.

Considering sewage may contain human waste, chemicals, debris and heated water, among other things, the ability to use the sewage as a heat source to preheat inlet of a water supply will greatly reduce costs associated with heating the inlet water sourced as hot water.

IV. BRIEF DESCRIPTION OF THE DRAWINGS

The invention may take physical form in certain parts and arrangement of parts, some embodiments of which will be described in the specification and illustrated in accompanying drawings which form a part hereof, wherein, when referring to the drawings, the inventor identifies the following components thereto, FIG. 1 shows a partial standard straight drain waste pipe layout in proximity to and with a basic layout for an inlet hot water supply and heating unit, whereby arrows indicate directional flow of sewage and water respectively.

FIG. 4 is a cross-sectional view of an embodiment of the device according to the instant invention.

FIG. 5 is a cross-sectional view of an embodiment of the device according to the instant invention, whereby a weir dam is installed downstream.

FIG. 6 is a cross-sectional view of plane A-A from FIG. 4.

FIG. 7 is a cross-sectional view of plane B-B from FIG. 5.

FIG. 13 is a cross-sectional view of plane C-C from FIG. 12.

FIG. 14 is a cross-sectional view of plane D-D from FIG. 12, providing a second embodiment whereby a weir dam is disposed within the sewer downstream from inlet entry, to allow for example an inlet copper line to be submerged even if a small amount of water is being used and or small amount of sewage travelling through system.

V. DETAILED DESCRIPTION OF THE INVENTION

The instant invention is for a device for preheating inlet temperature of a water supply. The instant inventor has discovered that the heat contained in sewage from a drain and or sewage pipe may be reused and or recaptured to preheat cold inlet water which is first being led to a heating unit, such as a water heater, so that it may be used in a shower or dishwasher for example. In an embodiment, a sewer pipe and or drain inside a home or crawl has a portion removed and replaced with a device according to the invention, whereby said device consists essentially of a first conduit sized and shaped to be retrofitted to a portion of a sewer pipe, said conduit having at least one wall defining an interior that directs sewage across an interior base thereof; and, a second conduit disposed within said first conduit traversing across a portion of said interior base, whereby said second conduit is capable of receiving an inlet water supply and preheating same prior to directing the supply to a heating source.

Figure 1:
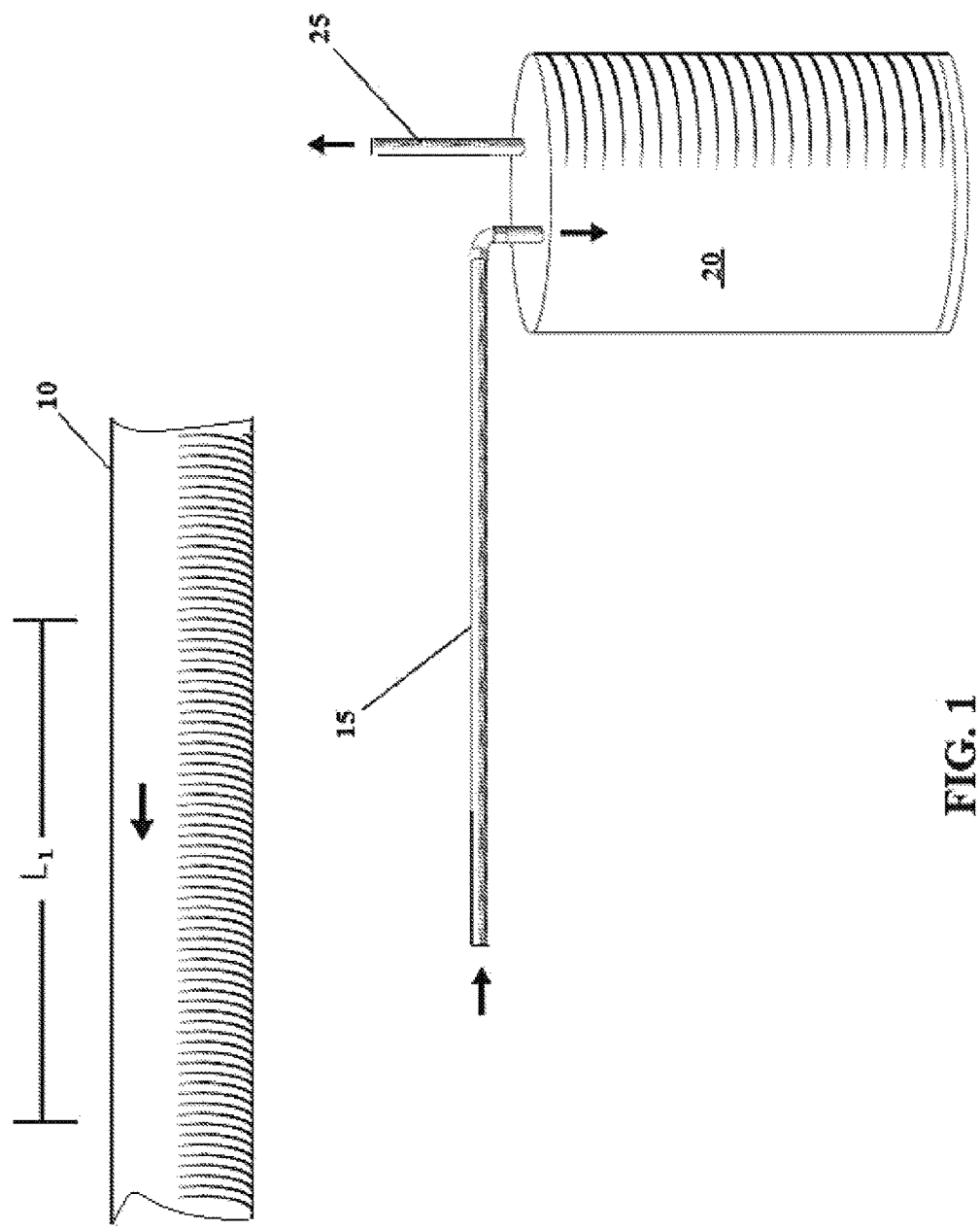

FIG. 1 shows a partial standard straight drain waste pipe layout and basic layout for an inlet hot water supply and heating unit, whereby arrows indicate directional flow of sewage and water respectively. As shown, sewer 10 is orientated in a substantially horizontal direction, however it is understood that there is a pitch such that gravity will compel waste through the pipe. In the general configuration of FIG. 1, cold water is delivered via a conduit 15, referred to herein as a hot water supply inlet, to a water heating unit 20 such as a hot water heater. Upon being heated, the hot water is sourced to a shower, sink and the like. Once the water is used and or spent, it continues through a sanitary sewer system by means of a conduit 10, referred to herein as a sewer and or drain. In addition to spent hot water, additional materials flow though said sewer including but not limited to chemicals, human waste, spent cold water, toilet water and related sewage and debris. Sewage passes through conduit 10 and is commonly directed away from a home, dwelling or building to be either treated or disposed. L1 is a measured length along waste pipe 10 that shall be removed to interpose and or retrofit the device according to an embodiment of the instant invention.

Figure 2:
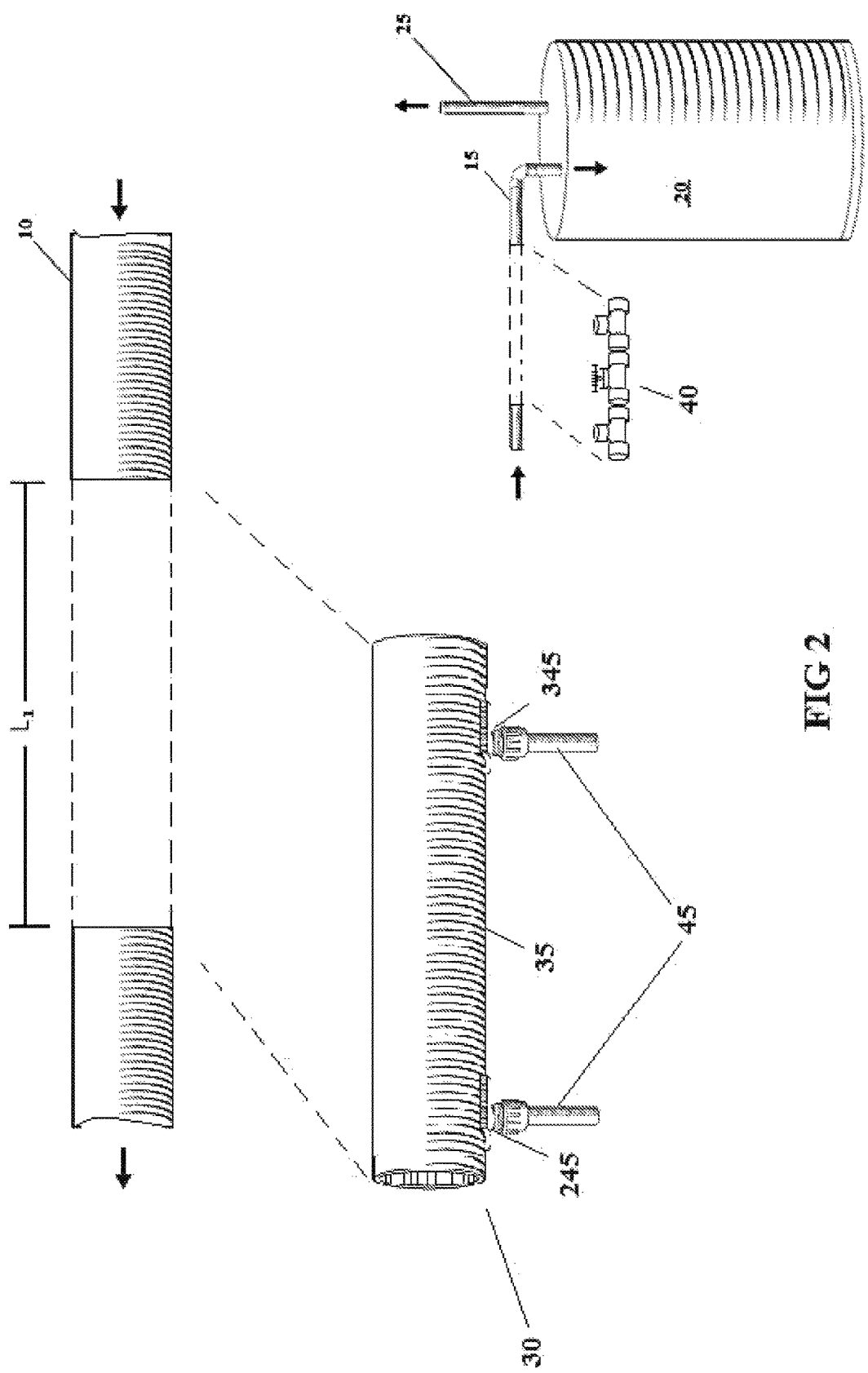
FIG. 2 is an embodiment of the device of the instant invention showing how the device is fitted to a straight drain, and how the hot water inlet supply is made to accommodate same.

FIG. 2 is an embodiment of the instant invention showing how a device 30 according to the disclosure herein is retrofitted to a straight drain conduit 10 and how the hot water inlet supply 15 is modified in order to accommodate same. As shown, a portion of drain 10 is removed to a sufficient extent such that a device 30 according to the instant invention may be inserted and or retrofitted therein. According to an embodiment, the device 30 may be cylindrical and or sized and shaped to seamlessly allow sewage to continue through an interior thereof that is defined by at least one wall of conduit 35. Disposed within conduit 35 is a second conduit 45 that extends along the base of conduit 35 within its interior. Conduit 45 is designed to communicate with inlet supply 15 by inlet and outlet ports (245 and 345) that respectively accept and direct inlet water in, through and out of conduit 35. As further shown in FIG. 2, two portions of the inlet supply pipe 15 is removed and fitted with a tee adapters 40, that communicate with the inlet and outlet ports 245, 345.

Figure 3:
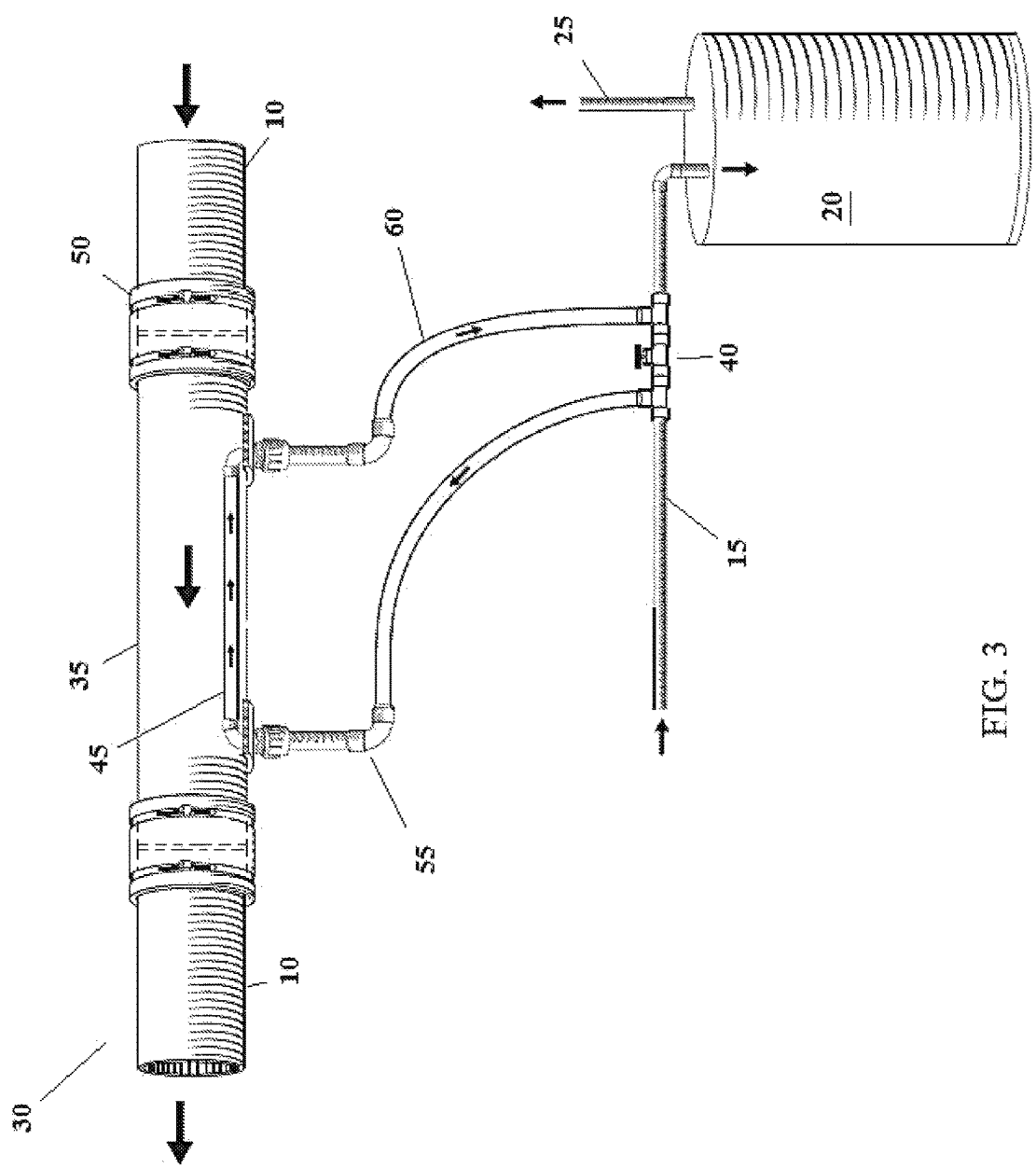
FIG. 3 shows an embodiment of the instant invention assembled when the sewer is a straight drain, whereby arrows indicate directional flow of sewage and water.

FIG. 3 shows an embodiment of the instant invention from FIG. 2, whereby arrows indicate directional flow of sewage and water. As shown, tubing 60 is used to connect tee adapters 40 with the inlet and outlet ports 245, 345 the connection of which may be benefitted by use of a coupler 55 such as copper to pex fitting, in the instance when the tubing 60 is pex and the inlet and outlet ports 245, 345 are copper. As shown, ends of conduit 35 are attached to sewer 10 by connection means such as a flexible coupling 50, however it is understood that the device may be retrofitted by other means including adhesives and other coupling means known in the industry. A flexible coupling 50 however provided for the system to be removed easily and reused elsewhere for example.

FIG. 4 is a cross-sectional view of an embodiment of the device according to the instant invention. As shown conduit 45 carrying an input water supply, is disposed along a portion of the base of conduit 35 directing a flow of sewage through an interior. As shown, conduit 35 is a sewer pipe that is substantially cylindrical and has an interior diameter which is greater than the diameter of conduit 45. It is within the scope of the invention that a portion of the exterior wall of conduit 45 is in contact with an inner wall of conduit 35 about the base so that even the smallest volume of sewage passing there through will contact an outer surface of conduit 45. Furthermore, avoidance of gap between the outer wall of conduit 45 and inner wall of conduit 35 about its interior base minimizes the ability for debris and or sewage to collect and cause a clog in the system. In an embodiment the flow of sewage through 35 travels in a stream from right to left. FIG. 5 is a cross-sectional view of an embodiment of the device 30 according to the instant invention, whereby a device capable of augmenting sewage, such as a weir dam 65 is installed downstream from the inlet conduit 45 in order to maximize the interaction of sewage with conduit 45. FIG. 6 is a cross-sectional view of plane A-A from FIG. 4. As can be seen, sewage 70 travels within conduit 35 and contacts the outer surface of the inlet conduit 45. As should be understood, sewage 70 consists of waste water, human waste, chemicals and debris among other things. Because contents of the inlet conduit 45 is essentially pressurized sourced inlet water coming from a cold source such as a well or city supply, the water is rather cold, about 50 degrees Fahrenheit for example. Material being directed through conduit 35 on the other hand is relatively warm. Due to the physics associated with thermodynamics, it is understood that heat flows naturally from an object of higher temperature to an object of lower temperature. As a result, heat travelling from sewage 70 will raise the temperature of the inlet water. It should also be understood, that ambient conditions in conduit 35 should raise the temperature as well as friction caused by material passing along the outer surface of conduit 45.

It is an object of the invention that conduit 45 is made from a material which should conduct heat well, such as copper. Because it is likely that there will not always be a constant stream of sewage travelling through conduit 35, the inventor has discovered that the imposition of an obstacle downstream from conduit 45, such as a weir dam for example, will cause a collection of sewage to remain in the base of conduit 35. As can be seen in FIG. 7, which is a cross-sectional view of plane B-B from FIG. 5, the weir dam 65 shall encourage maximum interaction between sewage 70 and inlet conduit 45 by puddling sewage 70 causing same to completely surround conduit 45. In an embodiment, obstacle 65 has a height that is about equal to or less than the height or diameter of inlet conduit 45.

Figure 8:
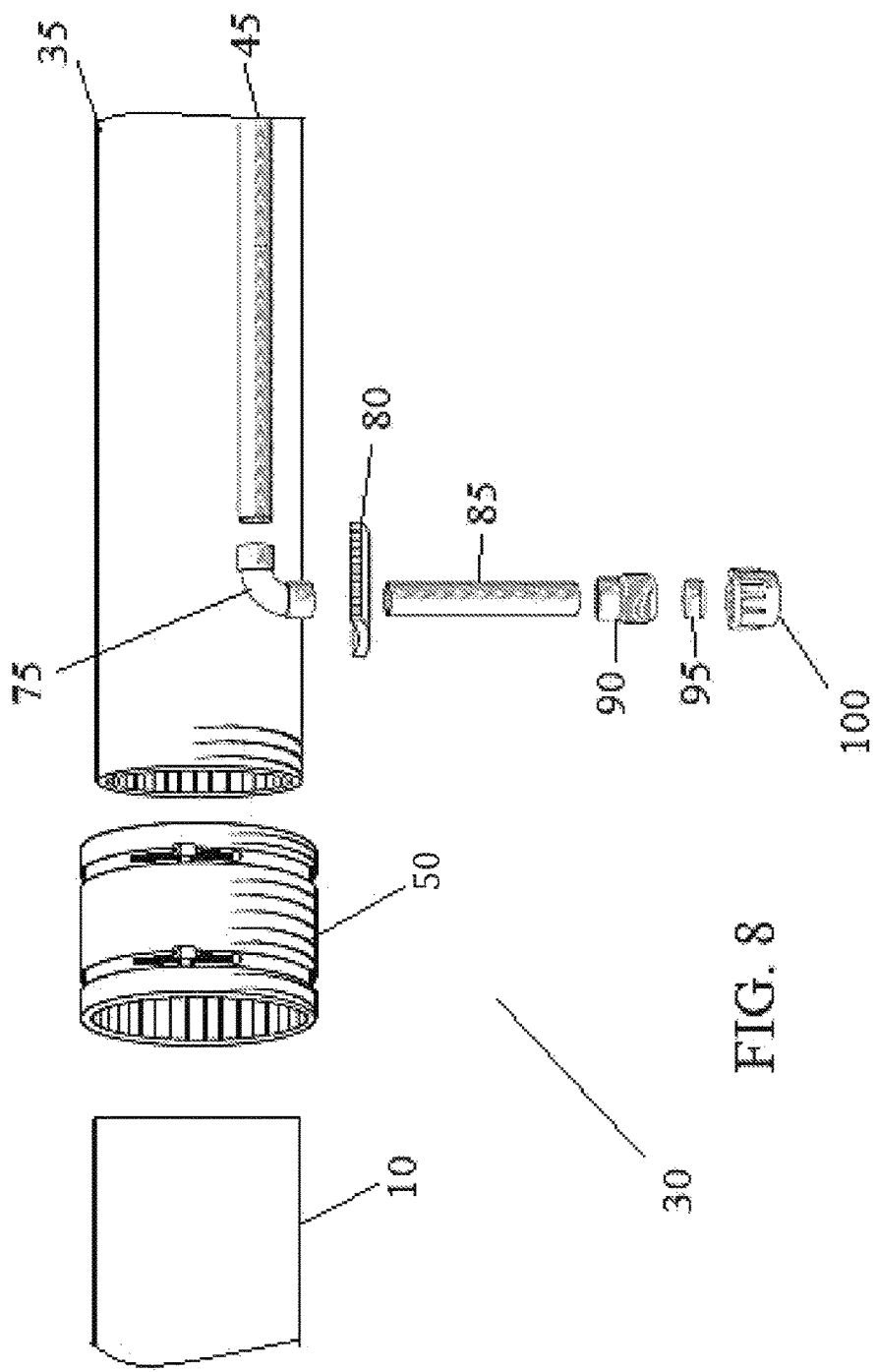
FIG. 8 is an exploded view of a first half of a device, the inlet side, according to the embodiment of FIG. 3, whereby said second half is a mirror image thereof.

FIG. 8 is an exploded view of a first half of a device according to an embodiment of the instant invention, 30 when sewer is a straight drain. While the device 30 essentially consists of a conduit 35 that directs sewage and has a conduit 45 disposed therein that communicates with and direct an inlet water supply through a portion of 45, FIG. 8 discloses an embodiment of a manufacture of the device. Whereby conduit 45 may be a pipe defined by a wall and having an interior. Said conduit 45 has opposing ends capable of being interposed with a sewer line and connecting thereto by means such as a flexible coupling 50. Conduit 45 is comprised of a material that is capable of transferring heat energy and is sized and shaped to accept an inlet water supply from outside conduit 35, then direct it through a portion of conduit 35 for preheating its contents, and then communicate contents beyond conduit 45 towards a heating unit. In the embodiment as shown in FIG. 8, outer wall of conduit 35, where inlet 45 shall exit therefrom, may first be reinforced by use of a doubler 80 attached to the outside wall of 35 before a port and or hole is formed there through. While inlet 45 may consist of a single unitary piece of copper bent at exit and entry ports for example, however it may also be modified and or segmented such that it connects to a complimentary extension 85 which for example is closely identical to conduit 45 and connected to same by units that simplify construction device, namely, a copper sweat 90 degree fitting 75, compression style fitting 90, O-ring 95 and compression nut 100.

Figure 9:
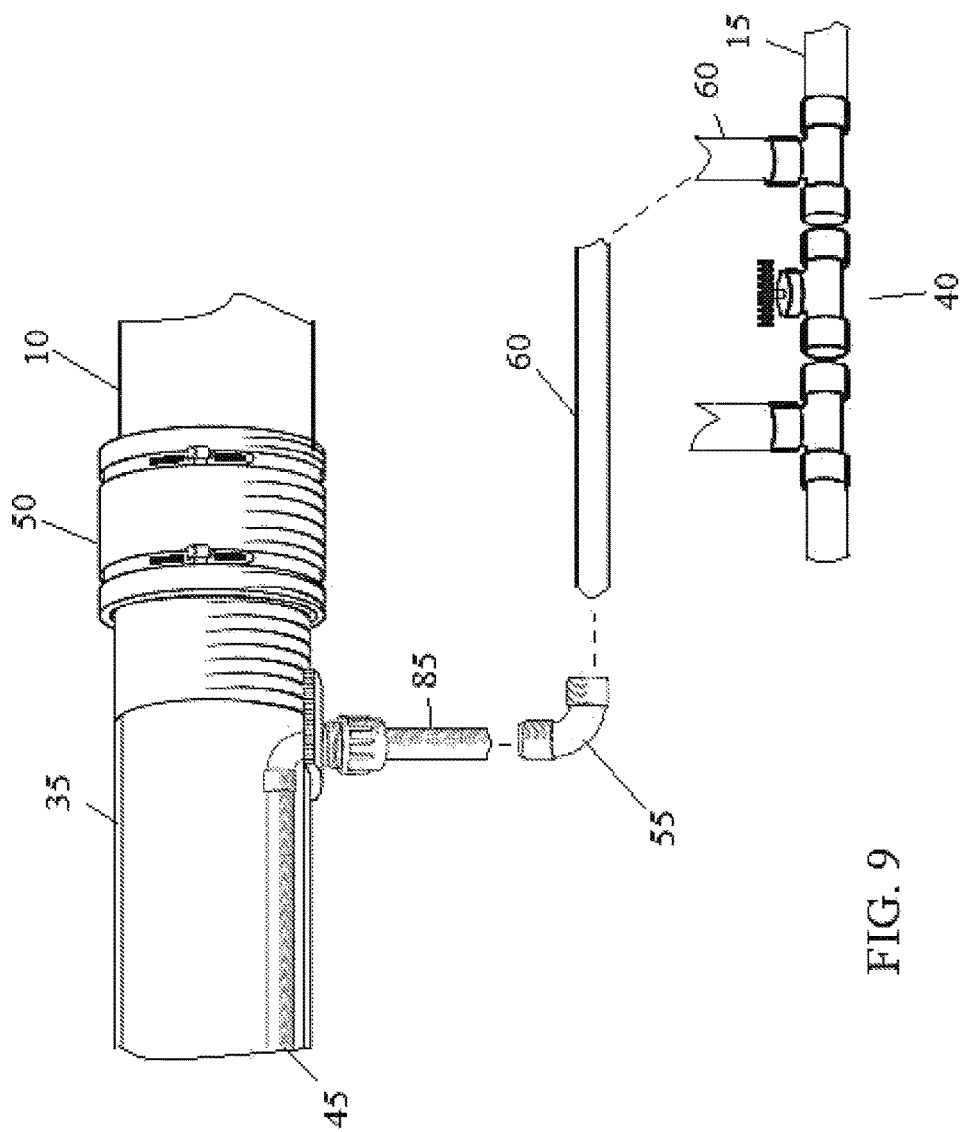
FIG. 9 shows a second half of a device according to the embodiment of FIG. 3, whereby the first half is a mirror image thereof. The figure further shows outlet adapted according to an embodiment of the instant invention with connecting units exploded.

FIG. 9 shows a second half of a device 30 according to the instant invention, after units are combined from FIG. 8. The first half is a mirror image thereof. The figure further shows an inlet 15 having been adapted according to an embodiment of the instant invention with intermediary connecting units exploded. A shown, conduit 60 is piping that communicates inlet 15 with conduit 45. Pipe 60 may be rigid plastic tubing, such as pex and connects at a first end to tee adapter 40 and at a second end to conduit 45 and or the extension 85 by connection means 55 such as a pex-to-copper coupling.

As known in the industry, drain and or sanitary sewer system, terms being used interchangeably herein, may be orientated, at least partially in a horizontal direction, as shown in FIGS. 1 and 3 for example, however the system may also be orientated in a vertical direction. Additionally, it is understood that the sewer system may exist in both orientations at different areas of a house for example, but depending on the layout of a particular construction of a home, a horizontal and or vertical sewer line may not be accessible or under the circumstances one line is favored over the other for preheating optimization. Accordingly, the device subject to the instant invention is capable of being adapted to a vertical system in a substantially similar fashion. In an embodiment, the device is interposed and or retrofitted in a portion of a vertical sewer and re-directs sewage flow in a horizontal direction away from the vertical drain by a first upper conduit at a pitch so gravity may compel waste there through and direct sewage through a second lower conduit which directs sewage flow in a horizontal direction back to the vertical drain at a pitch so gravity may compel waste there through. In the device subject to a vertical drain, a conduit may be disposed about a base within the interior volume of the first upper conduit, the second lower conduit or both.

Figure 10:
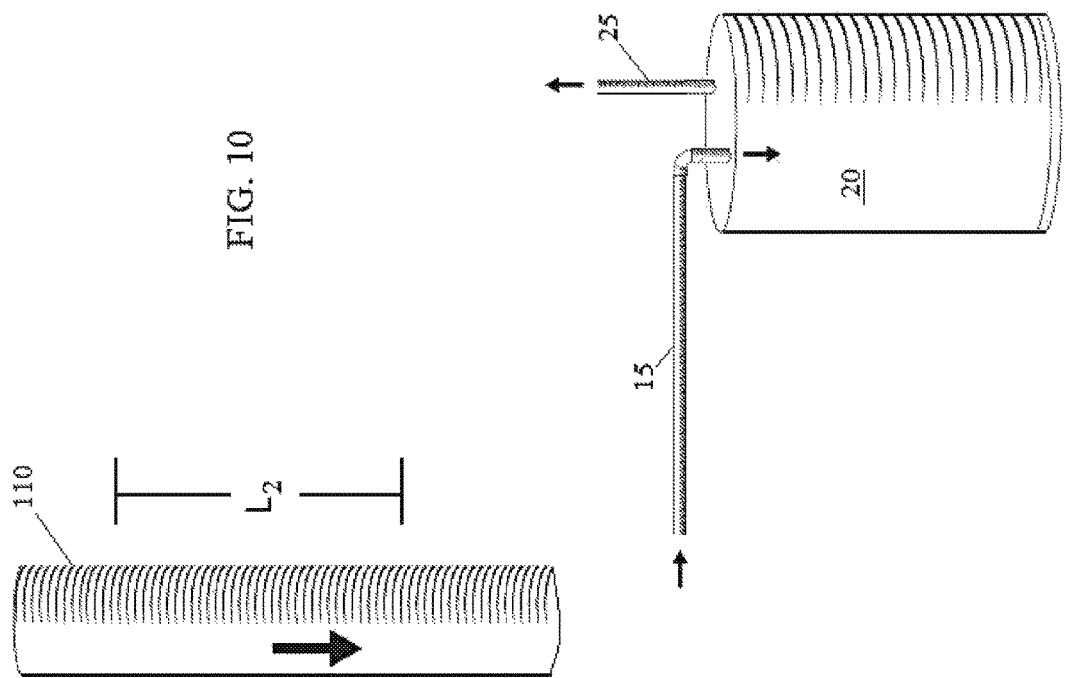
FIG. 10 shows a partial vertical drain waste pipe layout and in proximity thereto, a basic layout for an inlet hot water supply and heating unit, whereby arrows indicate directional flow of sewage and water respectively.
Figure 11:
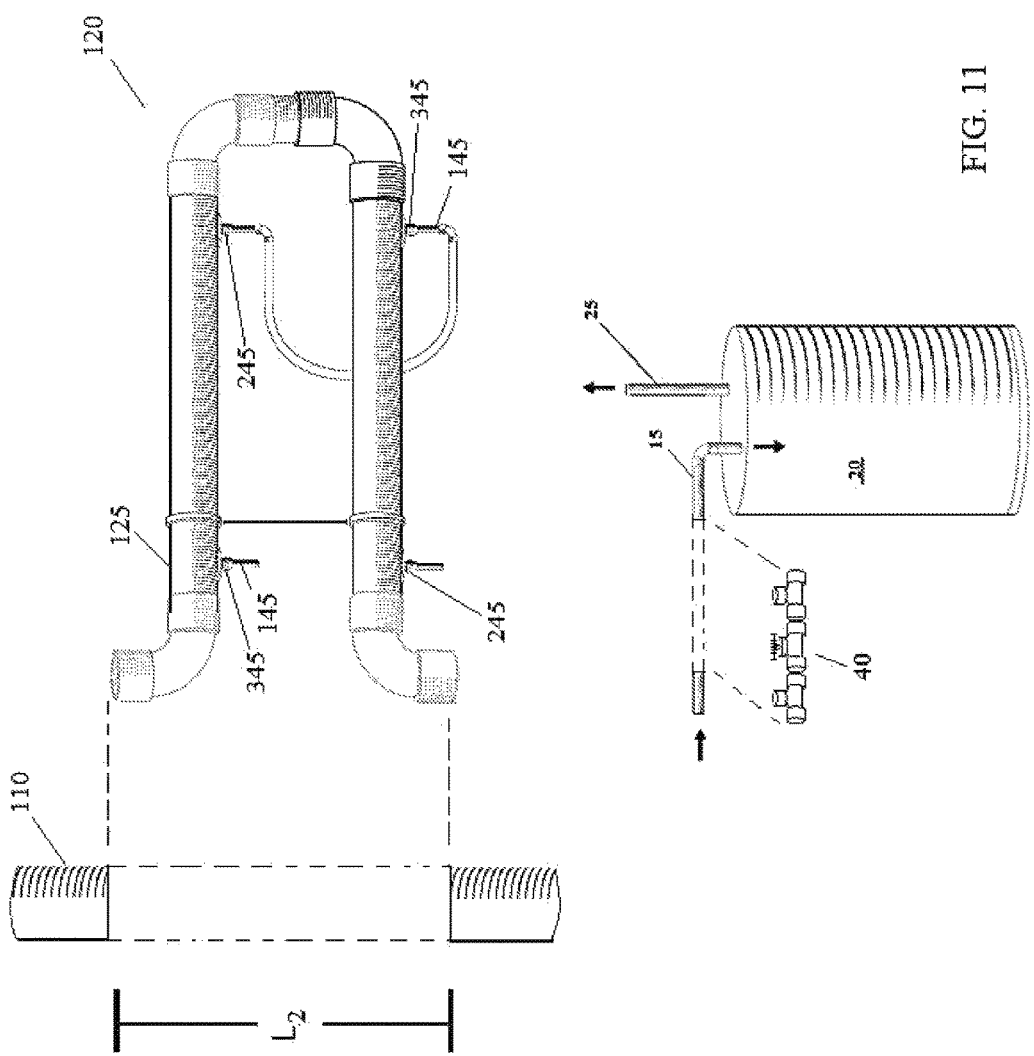
FIG. 11 is an embodiment of the instant invention showing how a device according to the disclosure herein is fitted to a vertical sewer and or drain and how the hot water inlet supply adapted to accommodate same.

FIG. 10 shows an example of a partial vertical drain waste pipe 110 layout and basic layout for an inlet hot water supply 15 and heating unit 20, whereby arrows indicate directional flow of sewage and water respectively. L2 is a measured length along waste pipe 110 that shall be removed to interpose and or retrofit the device according to an embodiment of the instant invention. FIG. 11 shows how device 120 according the disclosure herein is retrofitted to a vertical sewer and or drain 110 and how the hot water inlet supply 15 is modified to accommodate same. As shown, the device 120 consists of a conduit 125 having a distance measured from its upper opening to lower opening is less that about L2. Conduit 125 may be shaped similar to a '>' or '<' character and may be defined by at least one wall which extends in a horizontal direction at a pitch capable of directing sewage away from drain 110 at a flow rate that maximizes the interaction between conduit 125 and passing waste and minimizes the risk of clog; and then re-directs sewage back to drain 110. Disposed with a portion of the interior of conduit 125 is conduit 145, which as shown enters and exits a portion of the upper and lower portions of conduit 125 respectively at entry and exit ports 245 and 345.

Figure 12:
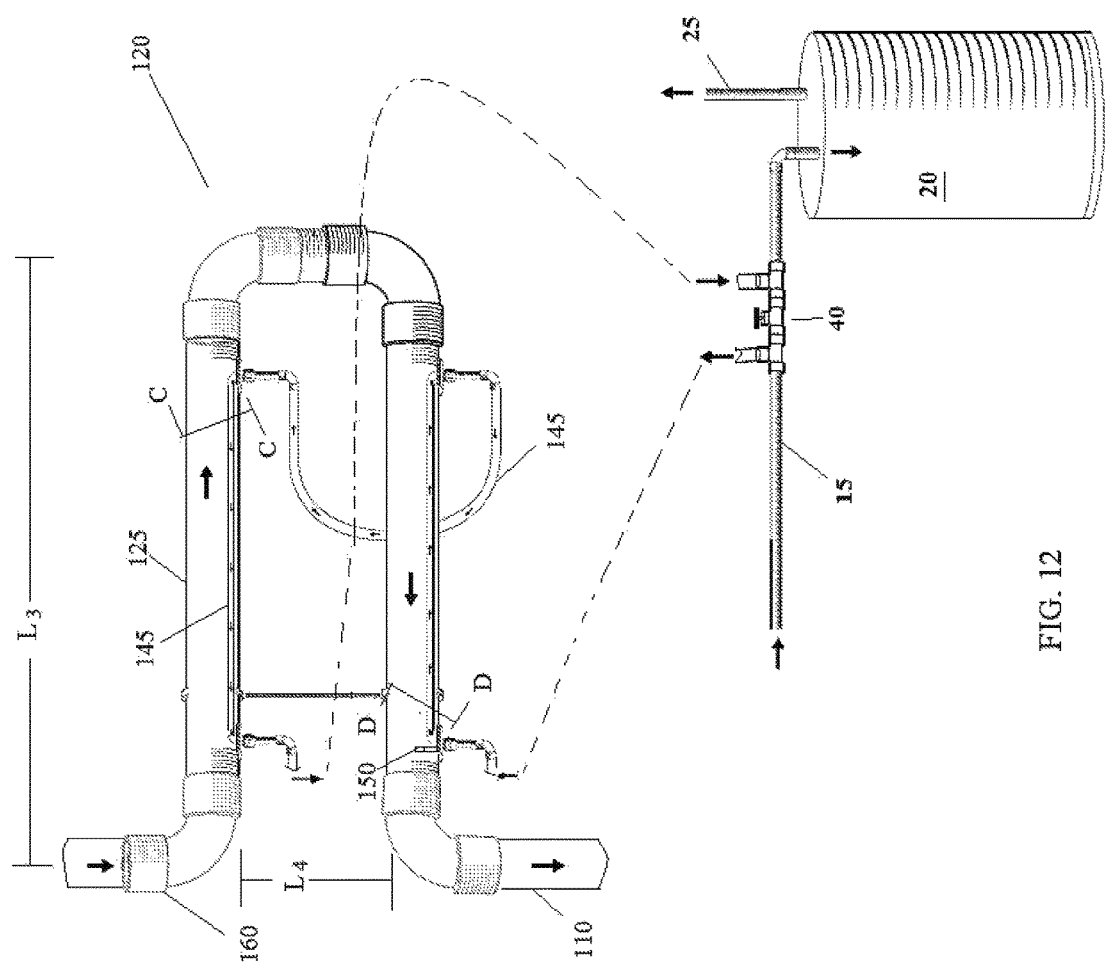
FIG. 12 shows an embodiment of the instant invention assembled when the sewer is a vertical drain, whereby arrows indicate directional flow of sewage and water and broken lines indicate tubing.

FIG. 12 shows an embodiment of the instant invention when the device 120 is connected and or retrofitted to a vertical drain 110 and connected to the inlet water supply 15, whereby arrows indicate the directional flow of sewage and inlet water. The device may be connected to the sewer 110 by use of flexible couplings 160. It is within the scope of the invention that the connection means shall include other connecting means not limited to adhesives and other couplings known in the industry. It is an embodiment of the invention that, as previously disclosed with regards to FIGS. 5 and 7, an obstacle and or weir dam 150 may be disposed within the device 120 downstream sewage from conduit 145 in order to puddle and or pool waste. As shown in FIG. 12 an obstacle is disposed downstream in proximity to conduit 145 within the lower lateral portion of conduit 125 however it should be understood that an obstacle may also be disposed similarly downstream to 145 in the upper lateral portion thereof or no obstacles may be used at all. Likewise, it should be understood that the entry ports may be used interchangeably with each in the lower and upper portion, as is the same for the exit ports. L3 defines a length of device 120 in its horizontal orientation and L4 defines the distance between the highest interior base point of conduit 125 and the lowest interior base point of conduit 125. It is an embodiment of the invention that effective heating may be provided when the ration of L4 to L3 is within the range of about 0.10 to about 0.40.

FIG. 13 is a cross-sectional view of plane C-C from FIG. 12 which shows an embodiment of a flow of sewage 70 contacting a portion of an outer wall of conduit 145 pooling of which may be understood as shown by FIG. 14 whereby a weir dam 150 or obstacle is disposed within conduit 125 downstream from inlet entry of conduit 145.

Figure 15:
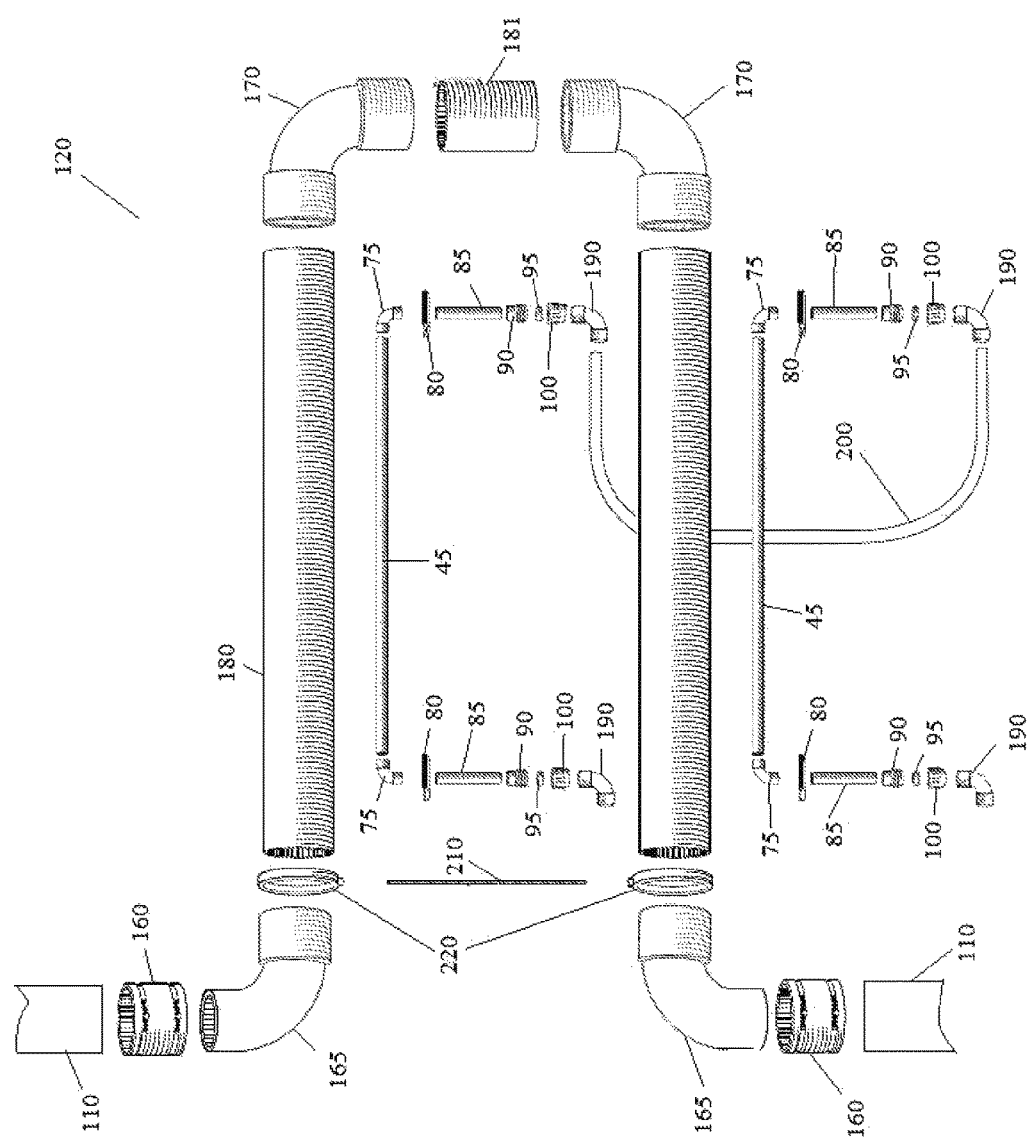
FIG. 15 shows an exploded view of the embodiment of the device in FIG. 12.

FIG. 15 shows an exploded view of the device 120 in FIG. 12 showing an embodiment of how it may be made as in complete form in prior FIG. 12. As shown, conduit 125 includes an upper portion and a lower portion whereby said portions are substantial mirror images and may consist of joined units including an adapter bend 165 which connects to drain 110 at a first end and connects to pipe 180 at a second end, and orientates pipe 180 a sufficient pitch to allow sewage to flow there through. Adapter 170 provides a bend to allow the upper portion to communicate with the lower portion and may be a unitary piece or have an interconnecting extension pipe 181 when segmented as shown. The majority of the balance of units disclosed is same as the disclosure subject to FIGS. 8 and 9 as previously discussed, identified by same numbers and incorporated by reference herein. With an exception to the incorporated is the existence of a bridge connection 200 that connects the outlet of conduit 145 extending from the lower portion of device 120 with the inlet of conduit 145 entering into the upper portion of device 120. As shown, lower extension 85 may be connected to the bridge by a copper-to-pex coupling. The composition of the bridge 200 may be pex tubing.

Aspects of the invention have been described in terms of illustrative embodiments thereof. Numerous other embodiments, modifications and variations within the scope and spirit of the disclosed invention will occur to persons of ordinary skill in the art from a review of this entire disclosure. For example, one of ordinary skill in the art will appreciate that steps illustrated in the figures and units thereof may be performed other than in the recited order and units substituted or replaced by equivalent means known in the art.

What is claimed is:

1. A device for preheating an inlet of a hot water supply comprising,
    a first conduit sized and shaped to bypass or replace a portion of a sewer pipe, including a toilet flushing line upstream thereof, whereby said conduit has at least one wall defining an interior that directs sewage across an interior base thereof;
    a second conduit disposed within said first conduit traversing across a portion of said interior base, whereby said second conduit is capable of receiving an inlet water supply and preheating same prior to directing the supply to a heating source, whereby the placement of said second conduit does not increase a clogging potential in said sewer pipe and does not require cleaning due to said toilet flushing line; and,
    an inlet port and outlet port formed through wall of said first conduit that allows the inlet water supply to be received and directed by the second conduit.

2. The device of claim 1 further comprising an obstacle disposed about the interior base of the first conduit downstream from the inlet port such that the obstacle causes sewage flowing within said first conduit to pool.

3. The device of claim 1 whereby said sewer is in a vertical orientation and said first conduit consists of an upper portion and a lower portion, whereby said upper portion extends laterally in a substantially horizontal direction away from the sewer and said lower portion extends from the upper portion laterally in a substantially horizontal direction towards the sewer.

4. The device of claim 3 whereby the ratio of the distance between the upper and lower portion of the first conduit to the length of the upper portion is about 0.10 to about 0.40.

5. The device of claim 1 whereby the first conduit is provided in a kit such that the device is substantially in ready to install form, sized complimentary to the corresponding waste and inlet pipe dimensions, and whereby the first conduit is provided with the second conduit, inlet and outlet ports prefabricated or in ready to assemble form.

6. A method of preheating an inlet of a hot water supply using the device of claim 1 and consisting of the steps:
    (a) measuring a length along a waste pipe that is to be removed in order to retrofit the first conduit thereby;
    (b) connecting the first conduit to the waste pipe;
    (c) interposing an adapter to bypass a cold-water inlet line that exits and returns upstream from a heating element; and,
    (d) connecting the inlet port to exit cold bypass and connecting the outlet port to the return bypass.

7. The method of claim 6 whereby the first conduit and the adapter are provided in a kit such that the device is substantially in ready to install form, sized complimentary to the corresponding waste and inlet pipe dimensions, and whereby the first conduit is provided with the second conduit, inlet and outlet ports prefabricated or in ready to assemble form.

* * * * *